(12) United States Patent
McNamara et al.

(10) Patent No.: US 6,545,799 B1
(45) Date of Patent: Apr. 8, 2003

(54) METHOD AND APPARATUS FOR OPTICAL SYSTEM LINK CONTROL

(75) Inventors: Thomas W. McNamara, Corning, NY (US); Mark A. Newhouse, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/373,309

(22) Filed: Aug. 12, 1999

Related U.S. Application Data
(60) Provisional application No. 60/098,807, filed on Sep. 2, 1998.

(51) Int. Cl.$^7$ .......................... H04B 14/00; H04B 10/12
(52) U.S. Cl. .................. 359/337.11; 359/161; 359/177; 359/337.13; 359/341.4
(58) Field of Search .................. 359/161, 177, 359/194, 337.11, 337.13, 341.4, 341.41–44

(56) References Cited

U.S. PATENT DOCUMENTS

| | | |
|---|---|---|
| 4,999,694 A | 3/1991 | Austin et al. |
| 5,005,175 A | 4/1991 | Desurvire et al. |
| 5,027,079 A | 6/1991 | Desurvire et al. |
| 5,088,095 A | 2/1992 | Zirngibl |
| 5,132,976 A | 7/1992 | Chung et al. |
| 5,181,210 A | 1/1993 | Chung et al. |
| 5,223,705 A | 6/1993 | Aspell et al. |
| 5,225,922 A | 7/1993 | Chraplyvy et al. |
| 5,237,576 A | 8/1993 | DiGiovanni et al. |
| 5,392,154 A | 2/1995 | Chang et al. |
| 5,406,404 A | 4/1995 | DiGiovanni et al. |
| 5,701,194 A | 12/1997 | Meli et al. |
| 5,737,118 A | 4/1998 | Sugaya et al. |
| 5,790,289 A | 8/1998 | Taga et al. |
| 5,986,782 A | 11/1999 | Alexander et al. |
| 6,040,933 A | 3/2000 | Khaleghi et al. |
| 6,064,501 A | 5/2000 | Roberts et al. |
| 6,323,994 B1 * | 11/2001 | Li et al. ................... 359/341.1 |
| 6,341,024 B1 * | 1/2002 | Jeong ......................... 359/130 |

FOREIGN PATENT DOCUMENTS

| | | | |
|---|---|---|---|
| EP | 0620660 | 4/1994 | |
| EP | 0647000 | 9/1994 | |
| EP | 0651476 | 10/1994 | |
| EP | 0695 049 A | 1/1996 | ........... H04B/10/17 |
| EP | 703678 | 3/1996 | |
| EP | 0790718 | 2/1997 | |
| EP | 0792035 | 2/1997 | |
| EP | 0792035 | 8/1997 | |
| EP | 0829981 | 9/1997 | |
| EP | 0829981 | 3/1998 | |
| EP | 0836254 | 4/1998 | |
| EP | 0838913 | 4/1998 | |
| EP | 0844750 | 5/1998 | |
| EP | 0845840 | 6/1998 | |
| JP | 10013382 | 1/1998 | |

\* cited by examiner

*Primary Examiner*—Nelson Moskowitz
(74) *Attorney, Agent, or Firm*—Svetlana Z. Short

(57) ABSTRACT

A method for tuning and improving the performance of an optical communication system comprising al link that includes optical amplifiers and, optionally, active and/or passive optical components such as, e.g., DWDM's, WADM's, and optical cross-connects, includes preferentially shaping and, in particular, flattening, with respect to the input power spectrum, the output power spectrum from the amplifier, component or of the link. A flattened output power spectrum is obtained by modifying the gain spectrum operating on the respective input power spectrum. Feedback for such gain modification is typically provided by optimizing the optical signal to noise ratio of each channel of the respective output power spectrum. A system link, an optical amplifier, and optical components having flattened output power spectra are also described.

14 Claims, 6 Drawing Sheets

METHOD AND APPARATUS FOR OPTICAL SYSTEM LINK CONTROL

This application claims the benefit of provisional application 60/098,807 filed Sep. 2, 1998.

FIELD OF THE INVENTION

Fiber optic communications systems continue to grow dramatically in terms of numbers, capacity, and complexity. One of the factors responsible for this trend is the increasing sophistication of optical amplifiers, particularly erbium doped fiber amplifiers (EDFA's). Furthermore, the technology driving EDFA's is expanding the spectral bandwidth in which such an amplifier can amplify input signals so that scores of channels with sub-nanometer spacing can be amplified and transmitted in current systems. Other network optical elements such as DWDM's, WADM's, optical cross-connects, etc., which are compatible for use in communications systems employing 80+channel amplifiers are also now available.

As data rates, bandwidths, and system architectures continue to grow with increasing demand, system performance remains the bottom line criteria, which becomes ever more challenging. EDFA's, for instance, exhibit characteristic gain spectra which dictate the transition of an attenuated input signal into an amplified output signal. In the days of single or few-channel optical systems, signal transmission could be selected in one or more spectral windows corresponding to flatter portions of the gain spectrum of the optical amplifier, however, for an 80 channel erbium doped fiber amplifier the gain spectrum from 1520 nm to 1565 nm is anything but flat. The unmodified gain spectrum for a typical erbium doped aluminosilicate fiber has a strong peak at about 1532 nm. As such, input channels in the spectral window undergoing significantly greater gain can reach power levels where nonlinear optical effects seriously degrade system performance. On the other hand, signal channels experiencing lower gain will typically exhibit reduced signal to noise ratios, also contributing to degraded system performance.

The non-flat gain spectrum of an erbium doped fiber amplifier is somewhat amenable to flattening through the use of gain flattening filters (GFF's). A shortcoming to this approach is that even a perfect GFF will only yield a flat gain amplifier spectrum at a specific operating point. As the operating conditions change (i.e., the inversion values change as a result of a change in, e.g., input power, spectral hole burning, pump wavelength drift, etc.) the gain shape will change and therefore the GFF will no longer yield a flat gain spectrum.

It is further possible to compensate for the changing operating conditions discussed above by adjusting the gain shape. This can be accomplished; for example, by tuning the pump wavelength, controlling the temperature of the erbium doped fiber, controlling the pump power, adjusting the amplifier gain via a variable optical attenuator, employing a tunable filter, and through other means appreciated by those skilled in the art. Typically, however, amplified systems that use such control techniques as discussed above are directed at flattening the gain spectrum of the amplifier or of each amplifier in a link having a plurality of amplifiers. In practice, even a finely tuned control scheme in combination with a GFF does not yield a completely flat gain spectrum. Both the control scheme and the GFF introduce some gain flatness errors. Gain or gain flatness sensing applied to an individual amplifier is only capable of detecting and correcting gain flatness errors due to that specific amplifier. The inevitable sensor errors due to optical tap and filter fidelity, local spectral hole burning due to a sensing channel, or other causes, result in a gain flatness error from each amplifier. When such random sensing errors cause several amplifiers in a link to tilt their gain spectra in a way that happens to correlate, large overall link power flatness and optical signal to noise ratio degradations appear. If gain flatness of each amplifier is optimized, these degradations can only be avoided by using extremely precise gain flatness sensors. Even if the amplifiers are identical and each is individually optimized for flatness, all gain flatness errors will accumulate. Thus power flatness errors due to control errors accumulate with each amplifier in the link. Accordingly, the inventors realized a need for improving optical amplifier, network optical element, and system link performance beyond that obtained by gain spectrum flattening for maintaining and improving overall optical communication system performance.

SUMMARY OF THE INVENTION

This objective and others, and the advantages associated therewith can be obtained according to the present invention in which the output power spectrum of an amplifier, network optical element, or an optical network link using these components, is preferentially shaped, and in particular, flattened to provide a flattened input power spectrum to an immediately following amplifier or component or to a receiving apparatus.

In accordance with a first embodiment of the invention, in an amplified, multiwavelength, multichannel optical transmission system which includes a network transmission link having N (N>1) optical amplifiers each of which supplies gain to an attenuated input signal spectrum for outputting an amplified signal spectrum, a method of tuning and improving the performance of the system includes the steps of detecting a characteristic of an optical signal (e.g., a peak power and a noise value) at the end of the link (e.g., at the output of the $N^{th}$ amplifier) and controlling the gain spectra of amplifiers in the link so as to maximize the optical signal to noise ratio (OSNR) at the end of the link.

In another embodiment of the invention, a method for tuning and improving the performance of an optical link in an optical transmission system which includes one or more optical amplifiers involves monitoring the output power spectrum of each amplifier And modifying the gain spectra of the amplifier as it operates on an input power spectrum to the amplifier to provide a flattened output power spectrum. In an aspect of this embodiment, the output power spectrum is flattened by optimizing the lowest OSNR for all of the output channels of the amplifier.

Another embodiment of the invention includes an amplifier, or a network optical element providing at least some equalization between input and output signals, or a network link comprising the optical amplifier and/or network optical element in which the optical amplifier and/or the network optical element and/or the end of the link has an output power spectrum profile that is flattened, and flatter than the profile of the respective input power spectrum. In an aspect of this embodiment, an exemplary amplifier is an EDFA, and exemplary network optical elements include DWDM's, WADM's, optical cross-connects, and others. These exemplary devices are by no means intended to limit the invention as any active or passive device capable of producing a modified output power spectrum is suitable.

In an aspect of all of the foregoing embodiments, a portion of the output from the respective device or link is diverted via a coupler or the like into a device such as an optical spectrum analyzer, which is coupled to a means for modifying the gain spectrum or an equalization spectrum of the respective device. Exemplary embodiments of techniques for modifying the gain or equalization spectra include gain tilt, input signal power level, input signal spectral profile, pump wavelength tuning, and/or generally modifying the inversion level of an active fiber.

In all of the foregoing embodiments, the per channel output power of each amplifier is preferably maximized subject to a maximum channel power ($P_{Channel}$) and total output power ($\Sigma P_{Channel}$), which are determined empirically to avoid penalties due to optical nonlinearities in the transmission fiber.

BRIEF DESCRIPTION OF THE DRAWINGS

The present invention will be more apparent from the following description of the preferred embodiments with reference to the accompanying drawings, wherein.

DESCRIPTION OF THE INVENTION

Figure 1:
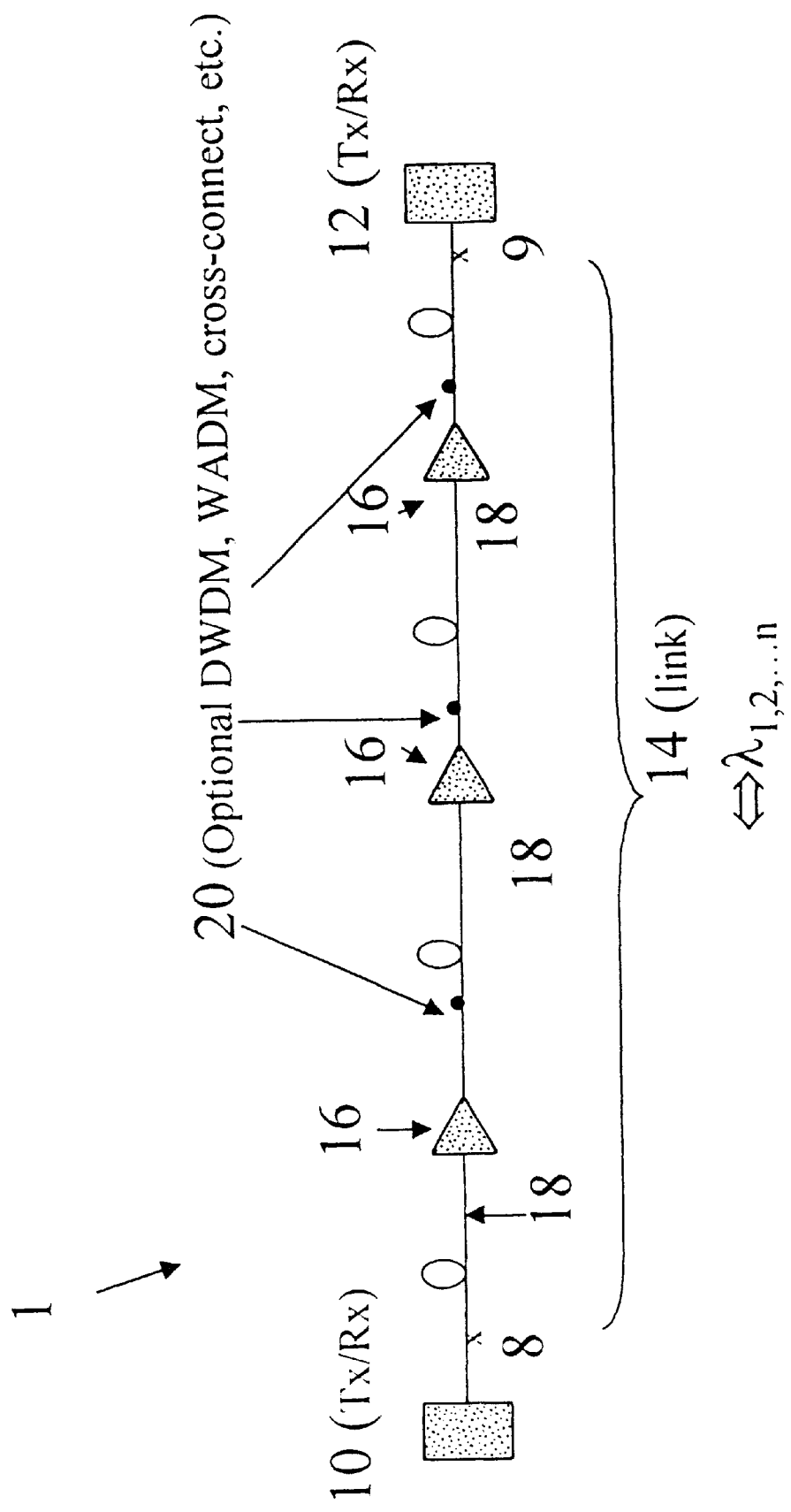
FIG. 1 shows a generic uni/bi-directional optical transmission system including a network link with N coupled optical amplifiers and optional network optical elements.

In a preferred embodiment of the invention, a method is disclosed for tuning and in particular for improving the performance of an optical transmission system. An optical transmission system, illustrated generically in FIG. 1, typically comprises at least two terminal stations 10, 12, each of which includes a transmitter and/or receiver depending upon whether the system is unidirectional or bidirectional, a network link 14 which typically includes a plurality of optical amplifiers 16 connected by various lengths of transmission waveguides such as optical fibers 18, and optionally containing various passive and/or active network optical elements 20 including, but not limited to, DWDM's, WADM's, optical cross-connects, etc. The invention embodied herein pertains to tuning and, more particularly, to improving the performance of the transmission system by modifying or improving the performance of the link. This can be accomplished by flattening the output power spectrum of the link (which is shown unflattened in FIG. 3 and flattened in FIG. 4). This can include flattening the output power spectrum of the final output of the link at the end of the link compared to the input power spectrum (shown schematically in FIG. 2) at the beginning of the link, or more preferably comprises flattening the output power spectrum of each optical amplifier and network optical element in the link experiencing an input and an output such that the input power spectrum to the next component in the direction of propagation of the optical signals has a preferred shape, e.g., flattened.

It will be appreciated by those skilled in the art that the invention is applicable to any network optical element having some type of equalization capability between signals input to the device and output from the device (most obviously, e.g., an amplifier, but also applicable, e.g., to a WADM). Accordingly, when reference is made to a component, the component referred to will be an optical amplifier and preferably an erbium doped fiber amplifier. The invention, however, is not limited in this regard as an EDFA merely best illustrates the method and structure of the invention.

Figure 2:
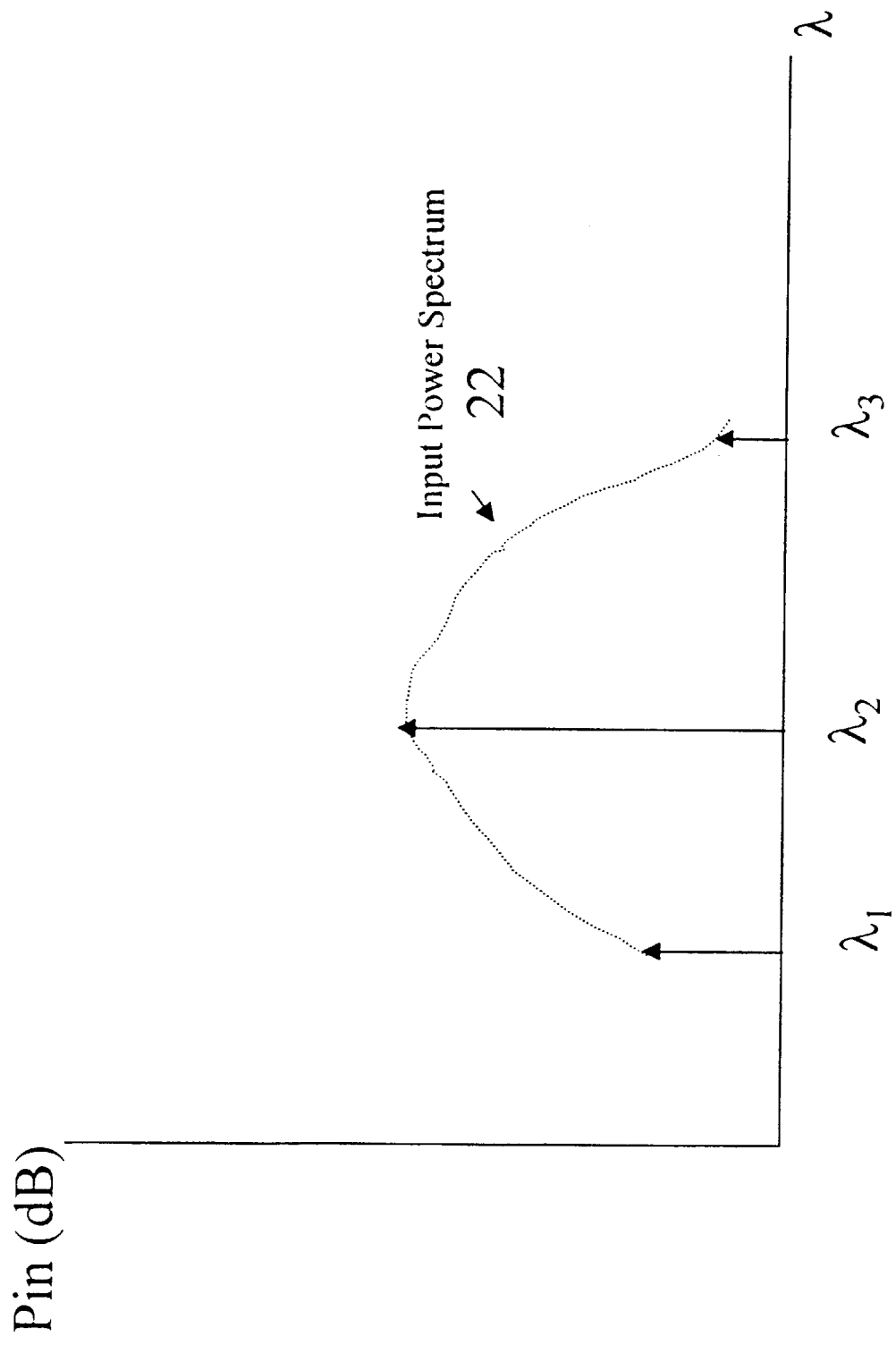
FIG. 2 shows a representative 3 channel input power spectrum for input to a link or a component in a link.
Figure 3:
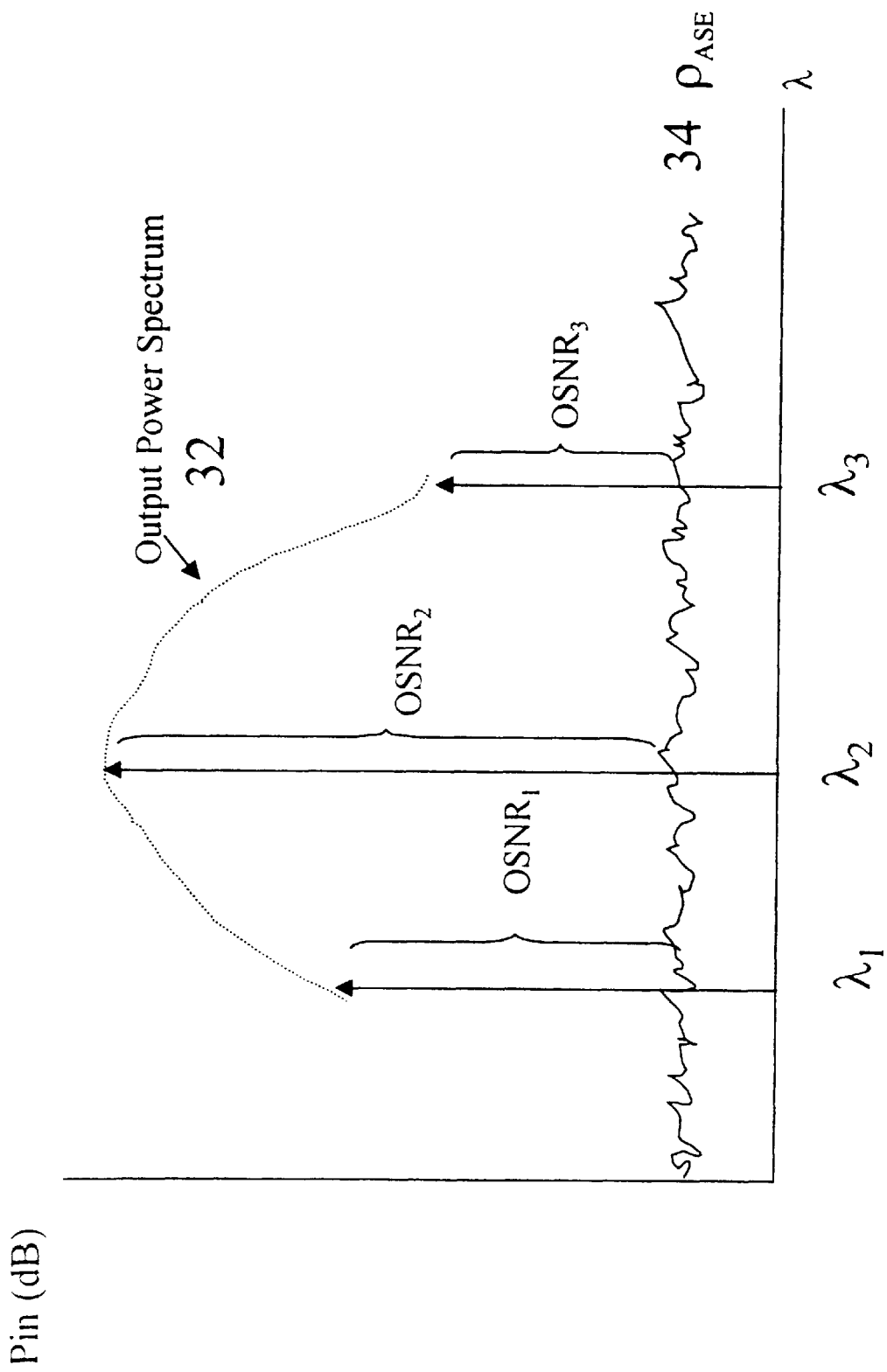
FIG. 3 shows a representative 3 channel output power spectrum resulting from a flat gain spectrum applied to the input power spectrum of FIG. 2, and a representative noise spectrum resulting from the amplification process.
Figure 4:
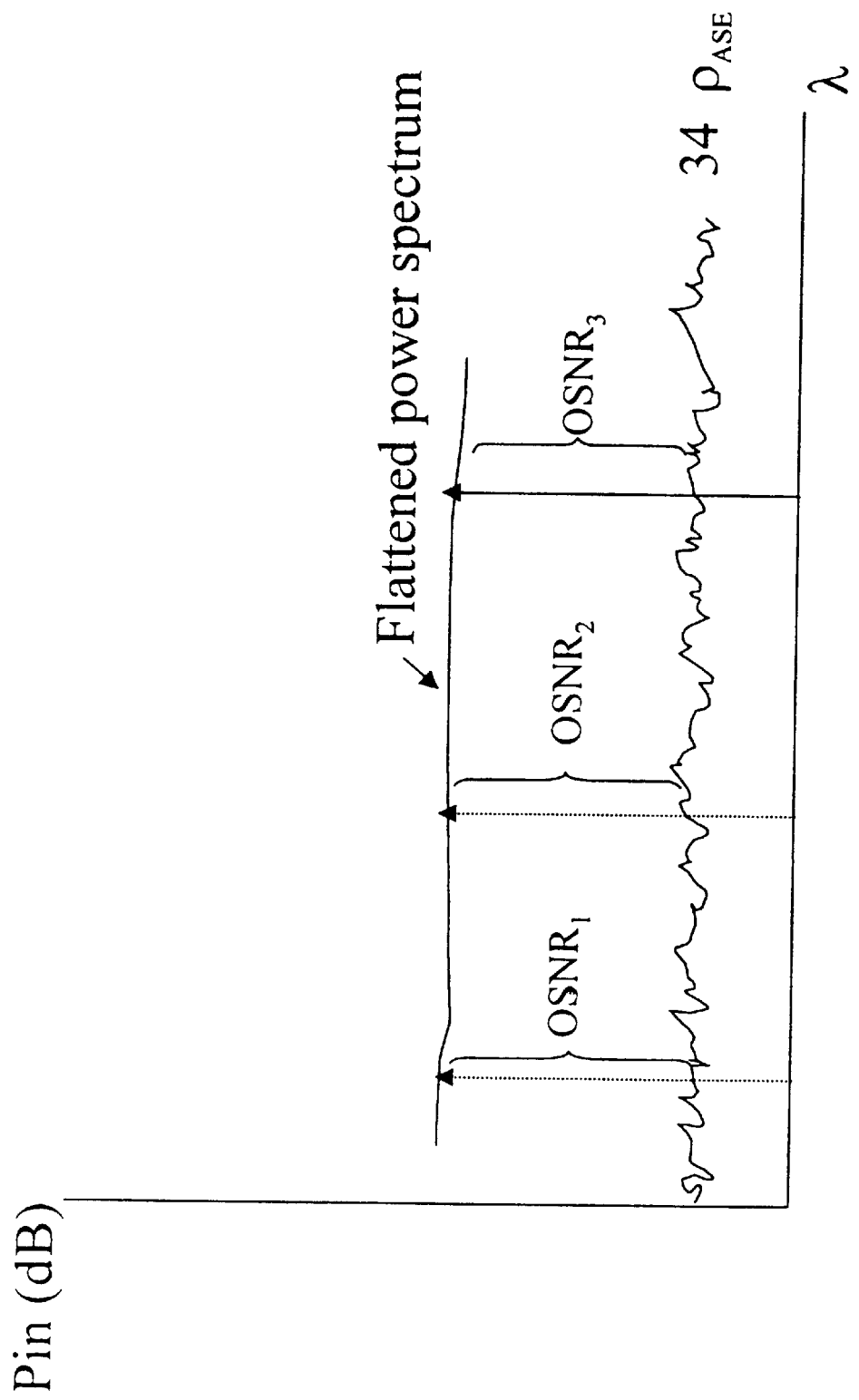
FIG. 4 shows the output power spectrum of FIG. 3 after it has been flattened according to an embodiment of the invention.
Figure 5:
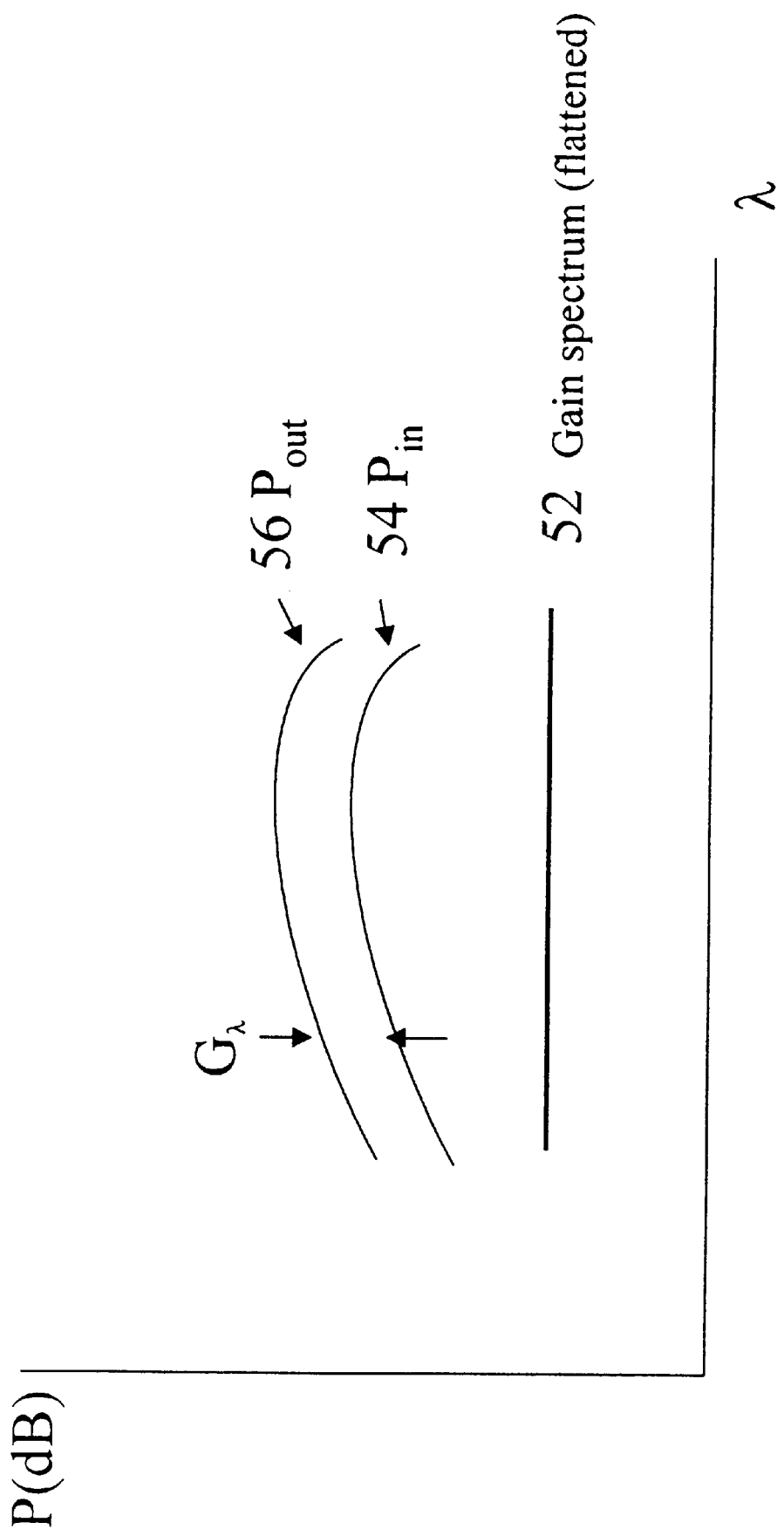
FIG. 5 shows an input power spectrum and the resulting output power spectrum due to a flat or constant gain spectrum.

In an amplified multi-wavelength, multi-channel optical transmission system 1 including a network link 14 containing a plurality of interconnected optical amplifiers 16 between the beginning 8 and end 9 of the link (FIG. 1), the output will be different from the input as shown in FIGS. 2 and 3; i.e., the multiwavelength output of an amplifier can: be characterized by a wavelength dependent spectrum 32 which will be a function of the input power spectrum 22 (FIG. 2) and a gain spectrum 52 (shown flattened in FIG. 5) of the amplifier having a shape depending at least in part upon particular operating conditions of the amplifier such as, e.g., the input power to the amplifier. Since an amplifier's or a link's output power spectrum becomes the input power spectrum for another component or segment of an optical transmission system, and the output power spectrum is dependent upon the gain provided to the respective input power spectrum, in which the gain can itself depend upon the input power spectrum, a non-flat output power spectrum 22 has significant potential for degrading the performance and quality of the system. As described in the previous section, however, ensuring a flattened gain spectrum 52 will not in and of itself ensure a flat or smooth output power spectrum 56 for example, when the input power spectrum 54 is not flat, as shown in FIG. 5.

It is well known by those skilled in the art that the amplification of an input signal inherently produces some amount of noise, $\rho_{ASE}$, and thus the term optical signal to noise ratio (OSNR) defines the magnitude of the signal relative to the magnitude of the noise. FIG. 3 is a representative graph of a multi-channel, amplified output power spectrum 32 for channels $\lambda_1$, $\lambda_2$, and $\lambda_3$, and the broadband noise $\rho_{ASE}$, 34, due to the amplification process. Taking the OSNR as the difference between a wavelength channel peak power (dB) and the noise power (dB) at that wavelength, one can see that $\lambda_2$ has a relatively good OSNR ($OSNR_2$) while $\lambda_1$ is not as good ($OSNR_1$) and $\lambda_3$ ($OSNR_3$) is the worst. (Note that although the noise spectrum, $\rho_{ASE}$, appears relatively flat over the wavelength spectrum, this is merely illustrative as the noise spectral density need not be flat. The value of $\rho_{ASE}$ is typically measured over a finite wavelength window, for example, in units of mW/0.1 nm, thus for the purpose of describing the invention the OSNR will be defined as the difference between the peak power at a specified wavelength and the noise magnitude at that wavelength, in dB, as represented by the formula $$OSNR(\lambda) = P_{out(dB)}(\lambda) - \rho_{ASE(dB)}(\lambda).$$

The worst OSNR of a particular amplifier, or of the link, limits the overall system performance and quality. Therefore, by optimizing and or maximizing the lowest or worst OSNR of each output power spectrum, a flattened output power spectrum will result and thus a flattened input power spectrum will be provided to the next amplifier or, a flattened output power spectrum will be delivered to a receiving component at the end of the link.

Figure 6:
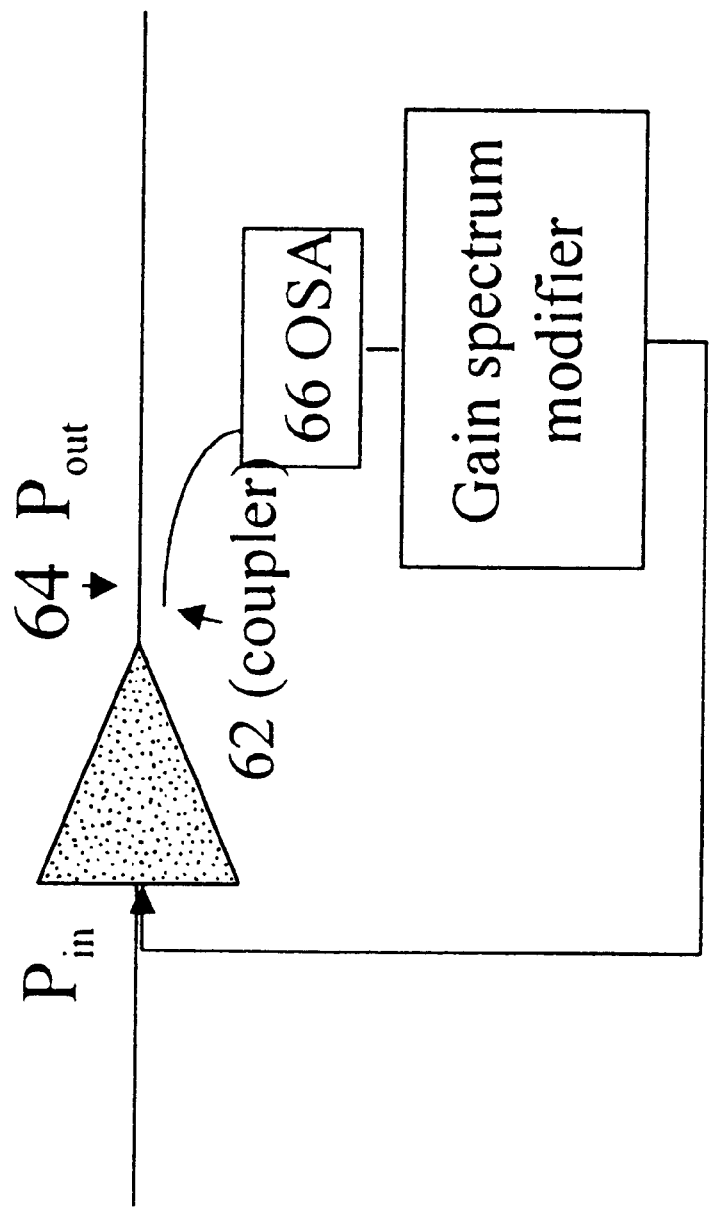
FIG. 6 schematically shows an embodiment of the invention in which a coupler diverts a portion of the output power from an amplifier into an optical spectrum analyzer, the data from which is used to modify the gain spectrum of the amplifier to obtain a flattened output.

According to an embodiment of the invention, one can maximize the OSNR at the output of each successive amplifier in the link and thus maximize the OSNR at the end of the link, by minimizing the differences in the output powers of the channels being amplified at each amplification stage. One way of accomplishing this, as shown schematically in FIG. 6, is to monitor and measure an output signal level and noise level of at least a portion of the amplifier output spectrum for each amplifier in the link. In an exemplary embodiment on the invention, a power tap or coupler, preferably an achromatic fiber coupler 62, positioned at the amplifier output 64, diverts a portion of the output spectrum into a spectrum analyzer 66 which monitors and displays the peaks and troughs of the output, representing the power and noise levels of each output signal. When the worst OSNR channel is detected the gain spectrum of the amplifier is adjusted such that the channel having the lowest OSNR is maximized. Numerous techniques exist for adjusting and or modifying the gain spectrum of an am plifier including, for example, modifying the input signal power, modifying the input signal spectral profile, introducing gain tilt, tuning the pump light wavelength of the amplifier as described in co-pending application Ser. No. 09/616,184 entitled Pump Wavelength Tuning of Optical Amplifiers and Use of Same in Wavelength Division Multiplexed Systems and incorporated herein by reference in its entirety, or modifying the inversion level of an active fiber in the amplifier as described in co-pending application entitled Thermal Tuning of Optical Amplifiers and Use of Same in Wavelength Division Multiplexed Systems, filed on Jun. 30, 1998, and incorporated herein by reference in its entirety.

Although the invention has been described in terms of flattening the output power spectrum of each successive amplifier in the propagation direction of the signal, the invention also embodies applying the same general techniques to the output power spectrum at the end of the link. All of the techniques mentioned for modifying the gain spectra of the amplifiers or other equalization approaches for network optical elements can be accomplished in real time, for example, by a search algorithm such as gradient descent maximization which is not in itself a part of the invention and thus requires no further description for an understanding of the invention.

We claim:

1. In an amplified multiwavelength, multichannel optical transmission system comprising a link having a beginning and an end, said link including a plurality of optical amplifiers each for outputting a signal having an output power that is higher than a respective input signal power to each respective amplifier, in which each amplifier is characterized by a gain spectrum having a shape depending at least in part upon an operating condition, said operating condition including an input power to the amplifier, a method for tuning the performance of the system, comprising the steps of:
   a) detecting a characteristic of an optical signal at the end of the link; and
   b) controlling said plurality of amplifiers in a manner to maximize an OSNR at the end of the link,; and
   c) monitoring and/or measuring an output signal level and a noise level of at least a portion of an amplifier output spectrum for each amplifier in the link.

2. The method according to claim 1, wherein the step of controlling said plurality of amplifiers comprises minimizing a deviation of the powers of the output signals from each respective amplifier in the link.

3. The method according to claim 2 comprising successively minimizing the deviation of the powers of the output signals in order of the direction of propagation.

4. The method according to claim 1, wherein the step of controlling said plurality of amplifiers comprises measuring and maximizing the OSNR at the output of each successive amplifier in the link.

5. The method according to claim 1, comprising the steps of:
   a) diverting the portion of the amplifier output spectrum from a main signal transmitting line connected to the output of the amplifier;
   b) inputting the diverted portion of the spectrum into a means for measuring a peak and a trough of each output signal of the output spectrum from each amplifier in the link.

6. The method according to claim 1, wherein the step of controlling said plurality of amplifiers in a manner to maximize an OSNR at the end of the link comprises adjusting the gain spectrum of at least one amplifier until a channel having the lowest OSNR is maximized.

7. The method according to claim 6, wherein the step of adjusting the gain spectrum of said at least one amplifier comprises changing at least one of the parameters including gain tilt, input signal level, input signal spectral profile, pump light wavelength, and inversion level of an active fiber in the amplifier.

8. In an amplified multiwavelength, multichannel optical transmission system comprising a link having a beginning and an end, said link including a plurality of optical amplifiers each for outputting a signal having an output power that is higher than a respective input signal power to each respective amplifier, in which each amplifier is characterized by a gain spectrum having a shape depending at least in part upon an operating condition, said operating condition including and input power to the amplifier, a method for tuning the performance of the system, comprising the steps of:
   (I) detecting a characteristic of an optical signal at the end of the link; and
   (II) controlling said plurality of amplifiers in a manner to maximize an OSNR at the end of the link, wherein the step of controlling said plurality of amplifiers in a manner to maximize an OSNR at the end of the link comprises;
   a) measuring the OSNR at the end of the link; and
   b) maximizing the lowest channel OSNR.

9. The method according to claim 8, wherein the step of maximizing the lowest channel OSNR comprises modifying the gain spectra of an amplifier in the link.

10. The method according to claim 9, wherein the step of modifying the gain spectra of an amplifier in the link comprises changing at least one of the parameters including gain tilt, input signal level, input signal spectral profile, pump light wavelength, and inversion level of an active fiber in the amplifier.

11. In an amplified multiwavelength, multichannel optical transmission system comprising a link having a beginning and an end, said link including a plurality of optical amplifiers each for outputting a signal having an output power that is higher than a respective input signal power to each respective amplifier, in which each amplifier is characterized by a gain spectrum having a shape depending at least in part upon an operating condition, said operating condition including an input power to the amplifier, a method for tuning the performance of the system, comprising the steps of:
(I) detecting a characteristic of an optical signal at the end of the link; and
(II) controlling said plurality of amplifier's in a manner to maximize an OSNR at the end of the link, wherein the step of controlling said plurality of amplifiers comprises adjusting gain spectrum of each individual amplifier in the link to improve OSNR at the worst channel for each of said individual amplifiers in the link.

12. The method according to claim 11, wherein the step of controlling said plurality of amplifiers comprises minimizing a deviation of the powers of the output signals from each respective amplifier in the link.

13. The method according to claim 12 comprising successively minimizing the deviation of the powers of the output signals in order of the direction of propagation.

14. The method according to claim 11, wherein the step of controlling said plurality of amplifiers comprises measuring and maximizing the OSNR at the output of each successive amplifier in the link.

* * * * *